June 12, 1951  C. F. AYDELOTT  2,556,386
BALED HAY LIFTER
Filed July 8, 1949  2 Sheets-Sheet 1
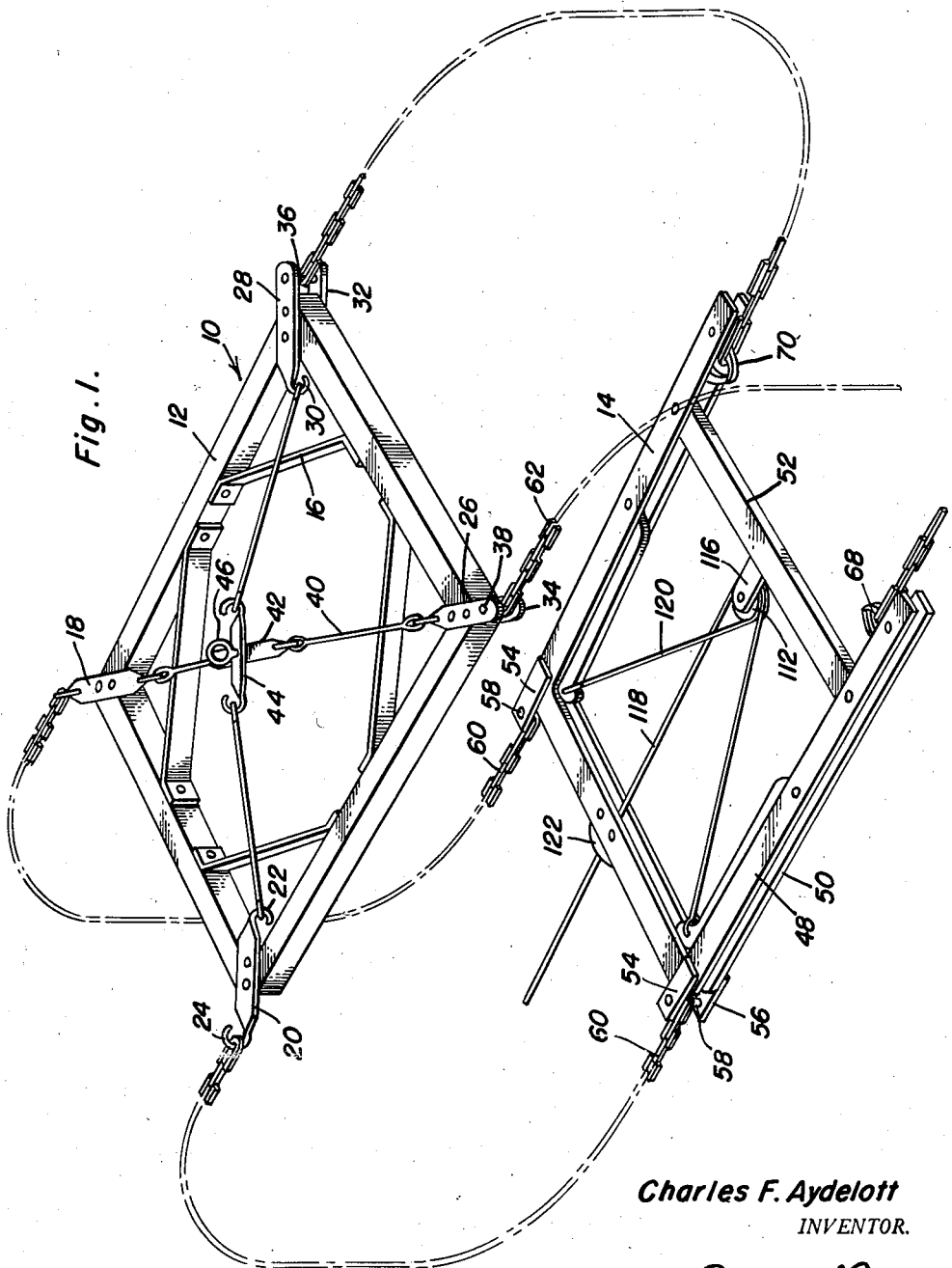
Charles F. Aydelott
INVENTOR.

June 12, 1951  C. F. AYDELOTT  2,556,386
BALED HAY LIFTER
Filed July 8, 1949  2 Sheets-Sheet 2
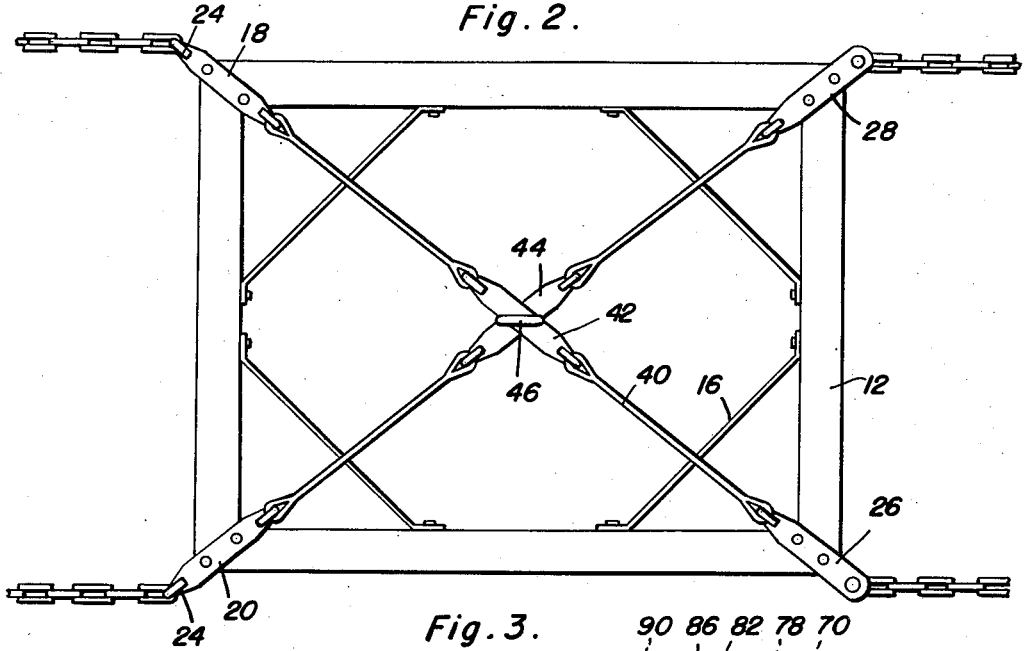
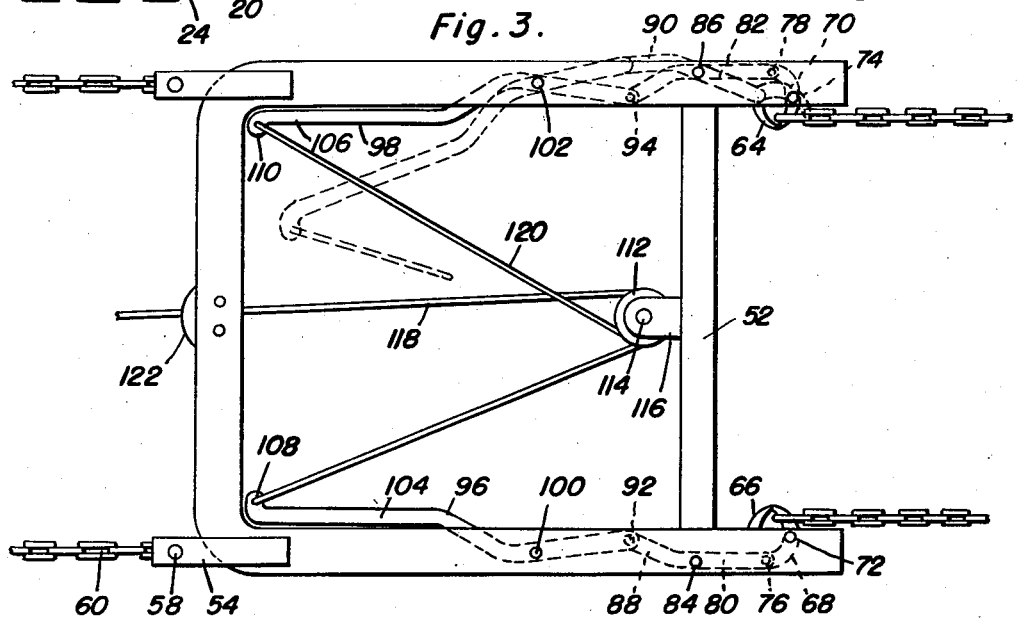
Charles F. Aydelott
INVENTOR.
BY *Clarence A. O'Brien*
*and Harvey B. Jackson*
Attorneys Patented June 12, 1951

2,556,386

UNITED STATES PATENT OFFICE 2,556,386

BALED HAY LIFTER

Charles F. Aydelott, Oakland City, Ind.

Application July 8, 1949, Serial No. 103,693

3 Claims. (Cl. 294—76)

This invention relates to a lifting sling for handling and moving containers, hay bales or the like and has for its primary object to enable any number of such objects to be lifted from one place and released in another place by the easy and simple manipulation of a trip member by an operator on the ground.

Another important object of this invention is to decrease the amount of time and labor necessary in storing baled hay by enabling more bales to be lifted into the storage place in a quicker and more convenient manner.

Another important object of this invention is to provide a lifting sling, which includes a pair of complementary frames adjustably joined together by flexible connecting members, one set of said members being automatically releasable upon the manipulation of a trip controlled by an operator on the ground.

These and ancillary objects and structural features of merit and other advantages are attained by this invention, a preferred embodiment of which is set forth in the following description and illustrated in the accompanying drawings, wherein:

Figure 1 is a view in perspective of one embodiment of this invention;

Figure 2 is a top plan view of the upper frame members, and,

Figure 3 is a top plan view of the lower frame members, which carries the tripping means for releasing one set of the connecting members.

Referring now to the accompanying drawings, this invention, generally designated by the character reference 10 includes an upper frame 12 and a lower frame 14. The upper frame 12 comprises a rectangular open frame which is reinforced at the corners by brace bars 16. A pair of plates 18 and 20 are riveted or otherwise secured to the corners of the frame at one end thereof, the plates extending diagonally outwardly from the frame and being formed at their inner ends with a down turned hook 22 and at their outer ends with a rearwardly extending upper hook 24.

Similar plates 26 and 28 are secured at the other end of the frame to the corners thereof and are formed at their inner ends with hooks 30, similar to the hooks 22 on the plates 18 and 20. However, the outer ends of the plates 26 and 28 are straight as plates 32 and 34 are secured to the opposite side of the frame in vertical alignment with the plates 26 and 28 so that pins 36 and 38 are vertically secured between the outer extending ends of the aligned plates. Stabilizing rods 40 are secured at one end to the hooks 22 and 30 of the plates and converge inwardly toward the center of the open frame and are joined to a pair of cross plates 42 and 44, which are centrally secured together in overlapping relationship by means of a connecting bolt or member 46.

The lower frame 14 includes an upper and lower U-shaped frame 48 and 50 which are secured together in vertical spaced relation. A crossbar 52 is connected between the vertically spaced legs of the frame, adjacent the end thereof. A pair of plates 54 and 56 are secured to the frames at the opposing ends of the bight portion of the frames and extend outwardly therefrom, in opposite directions from the legs and are disposed in vertical alignment. A pin 58 is vertically disposed between the extending ends of the plates and chains or similar flexible connecting members 60 are secured to the ends, the opposite ends of the chains being attached to the hooks 24 of the plates 18 and 20 of the upper frame. A similar pair of flexible connecting members or chains 62 are secured at one end to the pins 36 and 38 of the upper frame and are releasably secured to the open end of the lower frame by means of a trip mechanism.

The trip mechanism includes a pair of fixed jaws 64 and 66 which are carried by the opposing legs of the frame 14, adjacent the open ends thereof, the jaws being secured between the vertically aligned legs of the frame 48 and 50. Movable jaws, 68 and 70, which are complementary to the fixed jaws are eccentrically pivoted as at 72 and 74 between the complementary legs of the two sections of the frame 14. The jaws 70 and 68 are pivoted at their inner edge as at 76 and 78 to a pair of arms 80 and 82. The arms 80 and 82 are pivoted as at 84 and 86 between the two sections of the frame. The arms are formed with offset ends 88 and 90 which are secured by vertical pivot elements 92 and 94 to one end of a pair of actuating bars 96 and 98. The actuating bars are pivoted as at 100 and 102 between the sections of the frame 14, adjacent their pivoted ends and are formed with elongated offset ends 104 and 106, the offset ends terminating in apertured flanges 108 and 110 which are disposed adjacent the web portion of the sections of the frame.

A sheave 112 is rotatably journaled to the crossbar 52 by means of a vertical pin 114 which is journaled between a pair of vertically spaced apertured ears 116. A cable 118 is entrained around the sheave 112 and is formed with a bifurcated end 120 which is secured to the apertured flanges 108 and 110 on the two actuating bars. The cable 118 is disposed through a guide 122 at the web of the two sections of the frame.

In operation, a plurality of objects, such as bales of hay or the like are held between the two frames by means of the sets of chains 62 and 60. It is to be noted that the chains 60 may be shortened by attaching various links of the chain to the hooks 24 on the plates 18 and 20, depending upon the number of bales to be lifted. After the bales or similar objects have been placed between the two frames and securely locked therein by attaching the chains 60 to the hooks 24, one end of a lifting cable is hooked on the hook 46 centrally disposed in the upper frame 12 and the device, with the objects held therein, is lifted upwardly. As the device moves upwardly, the force of the load is exerted on the movable jaws 68 and 70 adjacent the inner surfaces of the legs of the complementary section of the frame 14. The weight of the load moves the movable jaws into the position, shown in full lines in Figure 3, the jaws swinging the arms 80 and 82 inwardly about their pivots 84 and 86 and forcing the arms up against the actuating bars 96 and 98 so that the bars and arms are disposed beyond their pivot points and the movable jaws are prevented from accidental movement away from the jaws 64 and 66.

When the device is raised and moved to the desired storage point, an operator pulls the cable 118 which, through its bifurcated end 120, moves the actuating bars inwardly about their pivots 100 and 102, as shown in dotted lines in Figure 3, and forces the arms 80 and 82 outwardly about their pivots. The outward movement of the arms brings the movable jaws to an open position and allows the end of the connecting chains 62 to slip off the movable jaws and drop the bales or load at the storage point.

It will thus be seen that a dependable and efficient lifting frame is provided, which will be positive in operation and can be simply employed in a conventional manner. Accordingly, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A lifting sling comprising an upper and a lower frame, flexible means connecting said upper and lower frames together at one side, flexible means connected to said upper frame at the side opposite to said one side, jaw means for releasably connecting said flexible means at said opposite side to said lower frame, and means for attaching lifting means to said upper frame, said lower frame being formed from a pair of U-shaped members secured in spaced relation to each other, said jaw means including jaw members mounted between each pair of complementary legs of said U-shaped members, control means for opening said jaws thereby releasing the flexible means, said control means including an actuating cable extending through the base of said U-shaped members and connected to said jaw members whereby said jaws can be opened and said lower frame moved from beneath said upper frame.

2. A lifting sling comprising an upper and a lower frame, flexible means connecting said upper and lower frames together at one side, flexible means connected to said upper frame at the side opposite to said one side, jaw means for releasably connecting said flexible means at said opposite side to said lower frame, and means for attaching lifting means to said upper frame, said lower frame being formed from a pair of U-shaped members secured in spaced relation to each other, said jaw means including jaw members mounted between each pair of complementary legs of said U-shaped members, control means for opening said jaws thereby releasing the flexible means, said control means including an actuating cable extending through the base of said U-shaped members and connected to said jaw members whereby said jaws can be opened and said lower frame moved from beneath said upper frame, linkage means connecting said cable to said jaw members, said linkage means pivotally mounted between said complementary legs.

3. A lifting sling comprising an upper and a lower frame, flexible means connecting said upper and lower frames together at one side, flexible means connected to said upper frame at the side opposite to said one side, jaw means for releasably connecting said flexible means at said opposite side to said lower frame, and means for attaching lifting means to said upper frame, said lower frame being formed from a pair of U-shaped members secured in spaced relation to each other, said jaw means including jaw members mounted between each pair of complementary legs of said U-shaped members, control means for opening said jaws thereby releasing the flexible means, said control means including an actuating cable extending through the base of said U-shaped members and connected to said jaw members whereby said jaws can be opened and said lower frame moved from beneath said upper frame, linkage means connecting said cable to said jaw members, said linkage means pivotally mounted between said complementary legs, said linkage means including actuating bars, one end of each of said actuating bars having a toggle joint with links for securely positioning said jaws in closed position.

CHARLES F. AYDELOTT.

REFERENCES CITED

The following references are of record in the file of this patent:

UNITED STATES PATENTS

| Number | Name | Date |
| --- | --- | --- |
| 535,248 | Jenks | Mar. 5, 1895 |
| 2,063,651 | Woodruff | Dec. 8, 1936 |